United States Patent [19]

Humphries et al.

[11] Patent Number: 4,490,333

[45] Date of Patent: Dec. 25, 1984

[54] ANCHOR FOR REFRACTORY LINING

[75] Inventors: Michael J. Humphries, Ironia; Edward B. Schumacher, Holmdel, both of N.J.

[73] Assignee: Exxon Research and Engineering Co., Florham Park, N.J.

[21] Appl. No.: 437,512

[22] Filed: Oct. 28, 1982

[51] Int. Cl.³ .................. B01J 19/02; F27D 1/10; F27D 1/14

[52] U.S. Cl. .................. 422/241; 220/452; 422/242

[58] Field of Search .......... 422/240, 241, 242; 264/30; 196/133; 52/249, 269, 378; 220/452, 454; 432/252

[56] References Cited

U.S. PATENT DOCUMENTS

| | | | |
|---|---|---|---|
| 982,210 | 1/1911 | Johnson | 52/378 |
| 1,888,039 | 11/1932 | Huff | 196/133 |
| 2,525,821 | 10/1950 | Molique | 422/240 |
| 3,077,058 | 2/1963 | Hensel | 52/378 |
| 3,256,665 | 6/1966 | Salmi | 432/252 |
| 3,449,084 | 6/1969 | Smoot et al. | 422/148 |
| 3,471,183 | 10/1969 | Fischer | 52/378 |
| 3,587,198 | 6/1971 | Hensel | 52/378 X |
| 3,594,147 | 7/1971 | Galey et al. | 264/30 X |
| 3,958,946 | 5/1976 | Venable, Jr. | 264/30 X |

FOREIGN PATENT DOCUMENTS

| | | | |
|---|---|---|---|
| 637417 | 2/1962 | Canada | 52/378 |
| 577556 | 5/1946 | United Kingdom | 52/378 |

Primary Examiner—Barry S. Richman
Assistant Examiner—William R. Johnson
Attorney, Agent, or Firm—Donald F. Wohlers

[57] ABSTRACT

A fastening anchor for securing a second refractory layer to a previously applied first insulation layer made of ceramic material is disclosed. The ceramic anchor is partially driven into the first layer prior to setting of the first layer, and the second layer is applied over an enlarged head portion and serations of the anchor.

8 Claims, 6 Drawing Figures

ANCHOR FOR REFRACTORY LINING

BACKGROUND OF THE INVENTION

In the Petroleum industry, many process vessels made of metallic material are exposed to high temperature and high pressure internal environments. In such process vessels, it is conventional to line the interior of the metal shell thereof with suitable refractory material which serves to insulate the metal shell from the high temperature of the process, as well as protect the metal from the corrosive and erosive effects of the material being processed within the vessel. It has been conventional heretofore to apply one or more separate layers of ceramic insulation to such vessel interior surface, using metallic anchor members which are typically butt welded to the surface interior. When it has been desired to employ a dual layer of insulation as in applicants' present arrangement, it has also been conventional to use metallic anchors of a first predetermined height for securing the outermost insulation layer to the vessel wall and employ a second set of metallic anchors of greater height or stand-off from the wall for the anchoring of an innermost layer of refractory insulation. Alternatively, as in U.S. Pat. No. 2,525,821, a dual-layer of refractory insulation was applied by inserting steel anchors into the primary layer before it set, to which the secondary layer was attached.

However, these conventional prior art methods of securing a dual layer insulation to the vessel wall have been unsatisfactory in certain hostile corrosive environments within the process vessel and such metallic anchors, particularly those securing the hot face layer of refractory insulation, have been subject to weakening due to the high temperature environment of the process. When such metallic refractory anchors have failed in the past due to corrosion or loss of strength at elevated temperatures, disbonding or spalling of the higher density castable refractory inner lining has occurred permitting separation thereof from the underlying lower density insulation refractory leading to lining failure and premature shutdown of the unit for repair.

SUMMARY OF THE INVENTION

The foregoing difficulties with metallic anchor members are avoided by the present invention which contemplates a novel anchor configuration and choice of ceramic materials resistant to the high temperature and/or corrosive environment of the reaction vessel. Certain nitrides and carbides, and in particular reaction bonded silicon carbide, and silicon nitrides are preferred anchor materials. SiC and $Si_3N_4$ are preferred materials at present for the corrosive high temperature applications contemplated. Fabrication of these materials can vary regarding method and cost. The method selected will usually be determined by cost. Manufacturers using the same basic fabrication method will often have a wide price spread because of differences in material compounding and treatment. In any event, the refractory anchors will be considerably cheaper than the high cost metal alloy anchors previously used. Preferred fabrication methods could be pressing, extrusion, or casting and sintering at over 1100° C.; extrusion or pressing then heating to about 2000° C.; slip casting, drying and then fired at about 2200° C.; extrusion or pressing to about 1600° C.; hot pressing (2000 psi and about 1800° C.); or extruding or slip casting and reaction sintering at about 1300° C. The above materials and fabrication methods are favored because of industry activity regarding improvement of quality and cost reduction.

Not only is the ceramic anchor of the present invention immune from corrosion, otherwise attacking metal anchor members, but no substantial degradation of strength will occur at the elevated temperatures of the reaction vessel. In a preferred configuration for the securing of the secondary refractory layer to the primary insulating refractory layer, a serrated shaft having a plurality of notches therein is combined with an enlarged truncated head portion. In use these ceramic anchors or spikes are partially driven into the first layer of insulating material art random angles between 45° and 90° from the plane of the surface of the first layer and before the insulating layer achieves final set. After the first layer of lower density insulating refractory material has set about the ceramic anchors, the inner or hot face secondary refractory layer is either gunned or sprayed on, or alternatively may be cast in place in the conventional manner to completely surround the enlarged heads of the ceramic anchors to thereby securely fasten the secondary hot face refractory layer to the primary refractory layer. In accordance with the invention herein, the anchors are installed in a random pattern at varying angles to the refractory surface to avoid creating any planes of weakness as might occur if they were placed in rows of other regularized grid patterns.

Accordingly, it is an object of the present invention to provide a new and novel ceramic anchor method and configuration for securing a second layer of insulation to a previously deposited first layer of insulation.

Another object of the invention is to provide new and improved ceramic anchor resistant to high temperature and highly corrosive environments for securing insulation to the inner shell of a reactor vessel.

Another object of the present invention is to provide a new and novel method for insulating the internal walls of a vessel with a dual layer refractory insulating material.

A still further object of the invention is to provide a much more corrosive resistant insulation securing anchor which is stronger at elevated temperatures and easier to install than conventional metallic anchors.

Yet another object of the invention is to provide an insulation anchoring configuration which is more economical and of lighter weight than previous constructions.

These and other objects and advantages of the invention will become apparent and the invention will be more fully understood from the following description and drawings in which.

DESCRIPTION OF PREFERRED EMBODIMENT

Figure 1:
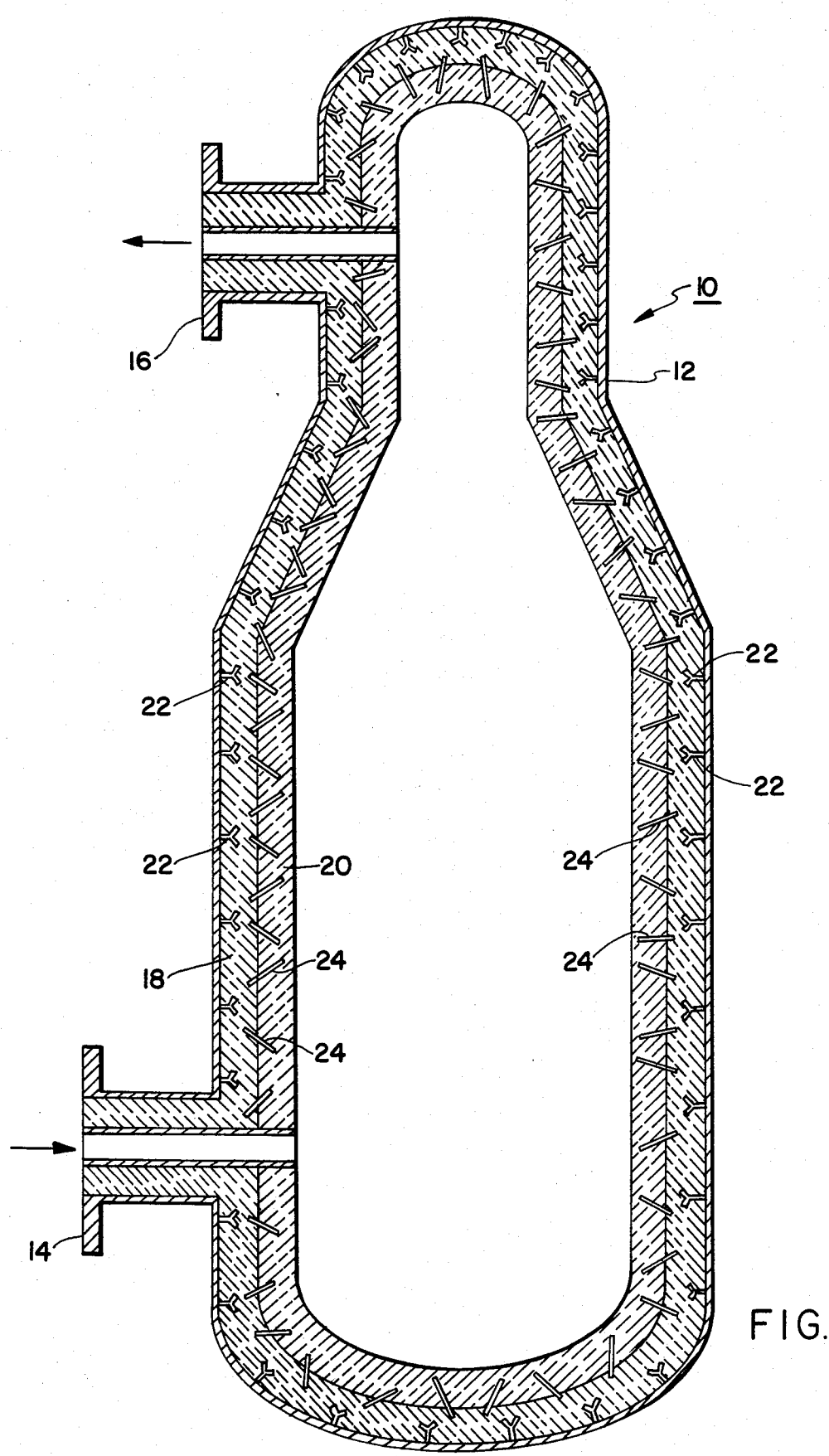
FIG. 1 is a vertical, cross-section view of a typical reactor vessel embodying the invention.
Figure 2:
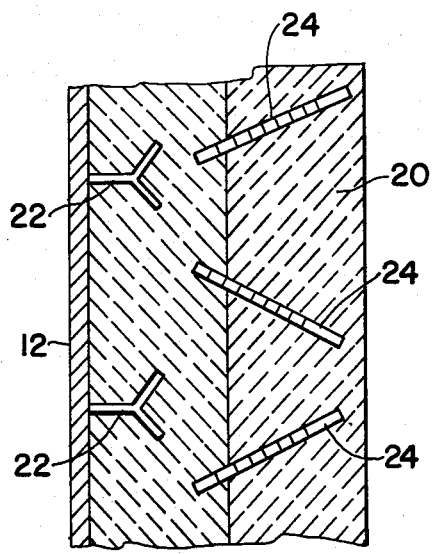
FIG. 2 is an enlarged cross-section of a portion of the vessel wall of FIG. 1.
Figure 3:
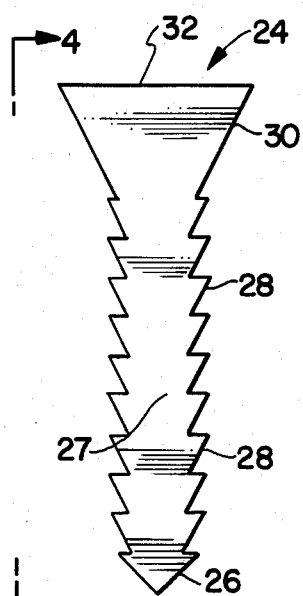
FIG. 3 is a vertical plan view of a preferred embodiment of ceramic anchor in accordance with the invention.
Figure 4:
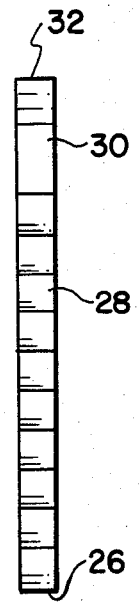
FIG. 4 is a side elevation taken along line 4—4 view of FIG. 3.

Referring to the drawings, a process vessel generally indicated at 10 includes an outer metal shell 12 having an inlet flange 14 and an outlet flange 16. The inner wall of the metal shell 12 includes a plurality of conventional metal anchor members 22 having y-shaped legs. The anchors 22 are typically butt welded at their outer ends to the inner wall of the shell 12. Adjacent the inner shell wall is a primary refractory insulating layer 18 which is of a density ordinarily lower than the density of the adjacent secondary refractory layer 20. Typically, the refractory insulating layer 18 is of any conventional and commercially available refractory material which may be gunned or sprayed on and which will subsequently cure or set up upon the evaporation of its liquid components. Engaging the inner surface of the refractory layer 18 are a plurality of ceramic anchors 24 which are installed over the inner surface of the layer 18 with random spacing at random angles between 45° and 90° relative to the plane of the inner surface of the refractory 18. These ceramic anchors which are in the form of a spike or nail as better shown in FIGS. 3 and 4 are preferably driven into the surface of the refractory 18 prior to its setting. Typically, as shown in the drawings, the penetration of each of the ceramic anchors 24 into the layer 18 is limited to approximately the lower third of its length so that a substantial portion of the serations 28 on the shaft of the anchor 24 is exposed for subsequent cover by the secondary refractory layer 20.

Referring more particularly to FIGS. 3 and 4, a preferred form of ceramic anchor 24 is shown. The anchor 24 includes a lower pointed end portion 26 with an elongated shaft 27 including a plurality of serations 28. The end of the anchor opposite the pointed end includes a truncated head portion 30 having a top surface 32 sufficiently enlarged to provide adequate holding and gripping of the secondary refractory layer 20. Preferably, the projected cross-sectional area of the top surface 32 is three times the cross-sectional area of the shaft portion of the ceramic anchor. Typically, the overall length of each ceramic anchor will be from three to four inches and may be, as shown in FIGS. 3 and 4, rectangular in cross-section. Once the plurality of ceramic anchors 24 are installed in the underlying insulation 18, and thereafter upon setting of such insulation 18, the final inner hot surface of more dense castable refractory material 20 is either sprayed or gunned on as was the first layer or, alternatively, layer 20 may be cast in place as is also conventional. Sufficient secondary refractory material is applied to completely cover the head portions of each of the ceramic anchors 24.

Figure 5:
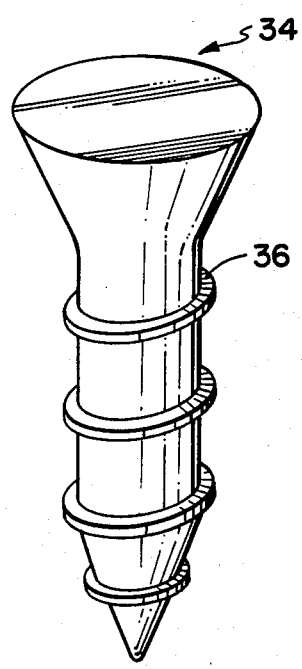
FIG. 5 is a perspective view of an alternate embodiment of ceramic anchor in accordance with the invention.

Referring to FIG. 5, an alternate form of ceramic anchor is disclosed and generally indicated at 34. This alternate embodiment includes a helical spiral thread 36 in place of the angular serations 28 of FIG. 3 embodiment.

Figure 6:
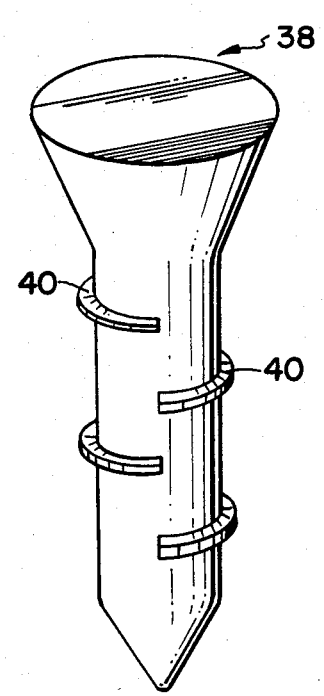
FIG. 6 is a perspective view of a second alternate embodiment of ceramic anchor in accordance with the invention.

Similarly, in FIG. 6, a second alternative embodiment of ceramic anchor is disclosed wherein a plurality of semi-circular peripheral lands 40 are provided on the shaft. Each of the lands 40 extends for an angle of approximately 180° about the shaft and each are staggered relative to the lands on the opposite side of the shaft of the anchor.

The anchor configurations shown in FIGS. 3 through 6 are typical of those that would serve the purpose described in the present invention. Those skilled in the art will readily appreciate that alternate configuration possibilities are endless. Suffice to say that anchor cross sections may consist of a geometry of straight or curved lines, shafts may be serrated or smooth, and shafts may be straight or curved. Of course, smooth anchor shafts, even without enlarged head portion 30, would develop holding capability by their installation at angles of other than 90° to the surface of the material in which they are initially inserted.

While specific embodiments of the invention have been shown and described in detail to illustrate the application of the inventive principles, it will be understood that the invention may be embodied or practiced otherwise without departing from such principles. In particular, while applicant has chosen to illustrate his invention in the environment of a process vessel, those skilled in the art will readily appreciate that the invention may be practiced in furnace environments, cyclone environments, or similar environments wherein it is necessary to provide a multi-layer insulation adjacent the metal surface in order to protect the metal surfaces from high temperatures and erosive or corrosive materials that would otherwise contact the metal surface.

What is claimed is:

1. An internally lined and insulated high temperature process vessel comprising:
a metallic shell, a plurality of metal anchor members welded to the interior wall of said shell, a gunned-on primary inner layer of low density insulating refractory material surrounding and covering all of said metal anchor members, a plurality of ceramic anchor members each having a reduced cross section area shaft portion merging into an enlarged tapered head portion, said shaft portion having a plurality of protruding serations at least some of which engage and penetrate partially into said low density insulating refractory material without contacting said metallic shell, and a secondary layer of higher density, high temperature resistant refractory material covering the enlarged head portions of said ceramic anchor members whereby said secondary layer of refractory material is secured to said metal shall solely by said high temperature corrosion resistant ceramic anchor members.

2. The combination of claim 1, wherein the projected area of said head portion is at least three times the cross-sectional area of said shaft portion.

3. The combination of claim 2 wherein said ceramic anchor members are randomly spaced and inclined relative to the plane of the surface of said primary inner layer at angles between 45 and 90 thereto.

4. The combination of claim 1 wherein said ceramic anchor members shaft portion comprises an elongated shaft having a pointed end portion and a truncated enlarged head portion secured to said shaft at the end opposite said pointed end, said head portion having a projected area at least three times the cross-sectional area of said shaft.

5. The combination of claim 4 wherein the pointed end portion is wedge shaped, and wherein the shaft is rectangular in cross-section.

6. The combination of claim 4 wherein said serations comprise a helical spiral about a circular shaft.

7. The combination of claim 4 wherein said serations comprise a plurality of staggered substantially semi-circular raised portions on opposite sides of a circular shaft portion of said anchor.

8. The combination of claim 4 wherein said ceramic anchor members are composed of SiC or $Si_3N_4$.

* * * * *